(12) United States Patent
Laskaris et al.

(10) Patent No.: US 8,018,102 B2
(45) Date of Patent: Sep. 13, 2011

(54) SHIELDING OF SUPERCONDUCTING FIELD COIL IN HOMOPOLAR INDUCTOR ALTERNATOR

(75) Inventors: Evangelos Trifon Laskaris, Schenectady, NY (US); James Pellegrino Alexander, Ballston Lake, NY (US); Kiruba Sivasubramaniam, Clifton Park, NY (US); Minfeng Xu, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 455 days.

(21) Appl. No.: 12/228,229

(22) Filed: Aug. 11, 2008

(65) Prior Publication Data
US 2010/0033037 A1    Feb. 11, 2010

(51) Int. Cl.
*H02K 9/00* (2006.01)

(52) U.S. Cl. .......................................... 310/52; 310/166

(58) Field of Classification Search .............. 310/52–59, 310/178, 166, 168
See application file for complete search history.

(56) References Cited

U.S. PATENT DOCUMENTS

| | | | | |
|---|---|---|---|---|
| 3,074,401 | A | * | 1/1963 | Friedman et al. ............... 422/46 |
| 3,363,207 | A | * | 1/1968 | Brechna ........................ 335/216 |
| 3,772,543 | A | * | 11/1973 | Woodson ........................ 310/52 |
| 4,223,239 | A | * | 9/1980 | Eckels ............................ 310/52 |
| 4,277,949 | A | * | 7/1981 | Longsworth .................. 62/47.1 |
| 4,278,906 | A | * | 7/1981 | Kullmann ....................... 310/52 |
| 4,578,962 | A | * | 4/1986 | Dustmann ...................... 62/505 |
| 2006/0028085 | A1 | * | 2/2006 | Qu et al. ....................... 310/178 |
| 2007/0085427 | A1 | * | 4/2007 | Sivasubramaniam et al. .. 310/52 |

* cited by examiner

*Primary Examiner* — Thanh Lam
(74) *Attorney, Agent, or Firm* — Penny A. Clarke

(57) ABSTRACT

A superconducting field coil assembly includes a superconducting field coil disposed within a vacuum insulated electromagnetic (EM) shielded cryostat. A water cooling jacket is thermally integrated with the outer surface of the EM shielded cryostat.

16 Claims, 5 Drawing Sheets

SHIELDING OF SUPERCONDUCTING FIELD COIL IN HOMOPOLAR INDUCTOR ALTERNATOR

BACKGROUND

The invention relates generally to superconducting homopolar inductor alternators, and more particularly to a technique for shielding a superconducting field coil within a homopolar inductor alternator against electro-magnetic (EM) fields.

A superconducting homopolar inductor alternator (HIA) utilizes a stationary superconducting field winding located between the rotor and the stator. The field winding is therefore exposed to alternating EM fields that result in eddy current and hysteresis losses. Excessive heating generated in a superconductor as a result of induced eddy currents and hysteresis currents can overheat, quench the superconductor, and shut down the electrical machine. Since all thermal losses in the superconductor must be removed by cryogenic refrigeration, a poorly shielded field winding would significantly increase the capacity and cost of the cryorefrigerator.

Typical HIA machines utilize resistive field windings that are designed to dissipate all the ohmic heating caused by the eddy currents, undesirably resulting in significantly lower machine efficiency.

It would be advantageous to provide a technique for shielding a superconducting field coil within a homopolar inductor alternator against electro-magnetic (EM) fields that overcomes the disadvantages described above associated with typical HIA machines.

BRIEF DESCRIPTION

Briefly, in accordance with one embodiment of the invention, a superconducting field coil assembly comprises:
  a superconducting field coil disposed within a vacuum insulated electro-magnetic (EM) shielded cryostat; and
  a cooling jacket thermally integrated with the outer surface of the cryostat.

According to another embodiment of the invention, a superconducting homopolar inductor alternator comprises:
  a superconducting field coil assembly disposed between rotor and the stator portions of the superconducting homopolar inductor alternator, the superconducting field coil assembly comprising a superconducting field coil disposed within an electro-magnetic (EM) shielded cryostat; and
  a cooling jacket thermally integrated with the outer surface of the EM shielded cryostat.

According to yet another embodiment of the invention, a method of cooling a superconducting field coil assembly comprises:
  configuring a superconducting homopolar inductor alternator with a superconducting field coil disposed within a vacuum insulated electro-magnetic (EM) shielded cryostat between rotor and stator portions of the superconducting homopolar inductor alternator; and
  cooling the EM shielded cryostat via a cooling jacket thermally integrated with an EM shield envelope of the cryostat.

DRAWINGS

These and other features, aspects, and advantages of the present invention will become better understood when the following detailed description is read with reference to the accompanying drawings in which like characters represent like parts throughout the drawings, wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Figure 2:
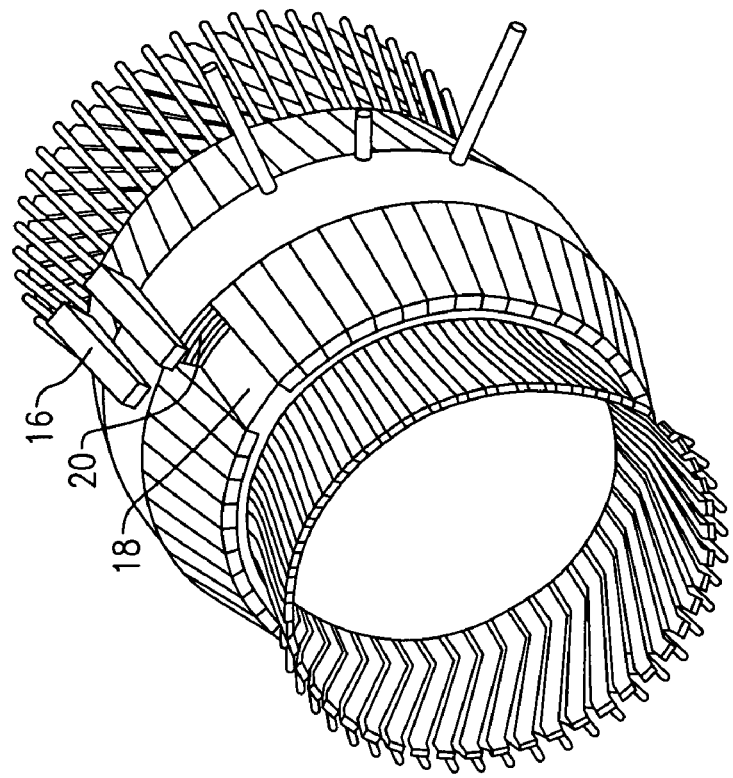
FIG. 2 is a pictorial diagram illustrating a high temperature superconducting (HTS) homopolar inductor alternator.
Figure 1:
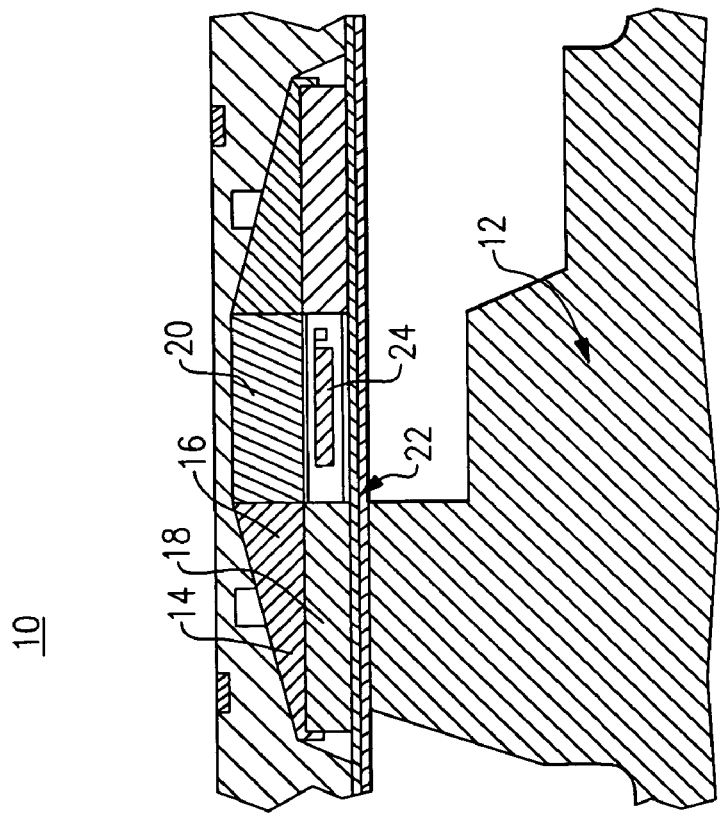
FIG. 1 is a cross sectional view of a high temperature superconducting (HTS) homopolar inductor alternator shown in FIG. 2.

FIGS. 1 and 2 illustrate a high temperature superconducting (HTS) homopolar inductor alternator 10, according to one embodiment of the invention. The HTS homopolar inductor alternator 10 includes a rotor 12 and a stator yoke 14. The HTS homopolar inductor alternator 10 further includes a circumferentially laminated section 16, an axially laminated section 18, a radially laminated section 20, and an armature winding 22. An HTS field coil/cryostat/EM shield assembly 24 is disposed between the rotor 12 and the stator yoke 14, according to one embodiment of the invention.

Because the HTS field coil/cryostat/EM shield assembly 24 is disposed between the rotor 12 and the stator yoke 14, the HTS field coil is exposed to alternating electro-magnetic (EM) fields that result in eddy current(s) and hysteresis losses. The HTS field coil cryostat provides EM shielding to the HTS field coil, and is therefore subjected to heating generated by the eddy current(s). Typical homopolar inductor alternators utilize resistive field windings that are designed to dissipate all of the ohmic heating caused by eddy currents, and therefore result in significantly lower machine efficiency than the HTS homopolar inductor alternator described herein.

Figure 3:
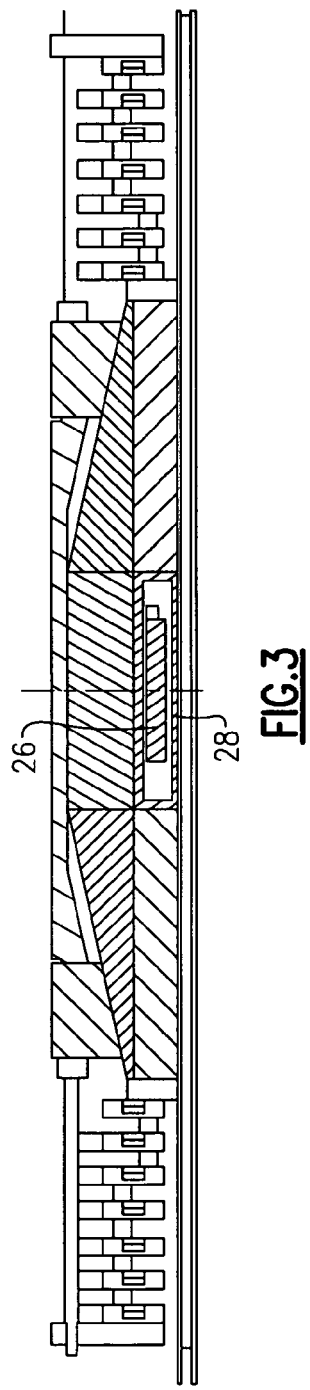
FIG. 3 is a sectional view illustrating placement of a HTS field coil and cryostat/EM shield within the HTS homopolar inductor alternator depicted in FIG. 2, according to one embodiment of the invention.

FIG. 3 is a sectional view illustrating placement of a HTS field coil 26 and cryostat/EM shield 28 within the HTS homopolar inductor alternator 10 depicted in FIG. 2, according to one embodiment of the invention. The HTS field coil 26 and surrounding cryostat/EM shield 28 advantageously provides for a very lightweight compact superconducting magnet structure that is capable of withstanding high shock and vibration loads. The HTS field coil 26 and surrounding cryostat/EM shield 28 further enables efficient use of a superconducting field winding within an alternating magnetic field environment to yield significantly higher machine power density and efficiency at a reduced cost. The cryostat/EM shield 28, according to one aspect of the invention, is made of high electrical and thermal conductivity materials(s), such as, without limitation, one or more skin depths of copper or aluminum. The high conductivity material(s) are configured with a thickness sufficient to act as an effective EM shield to attenuate the alternating magnetic fields reaching the HTS field coil 26. The heat produced in the cryostat/EM shield 28 by the eddy current(s) is removed via a compact water cooling jacket thermally integrated with the cryostat/EM shield 28, described in further detail below.

Figure 4:
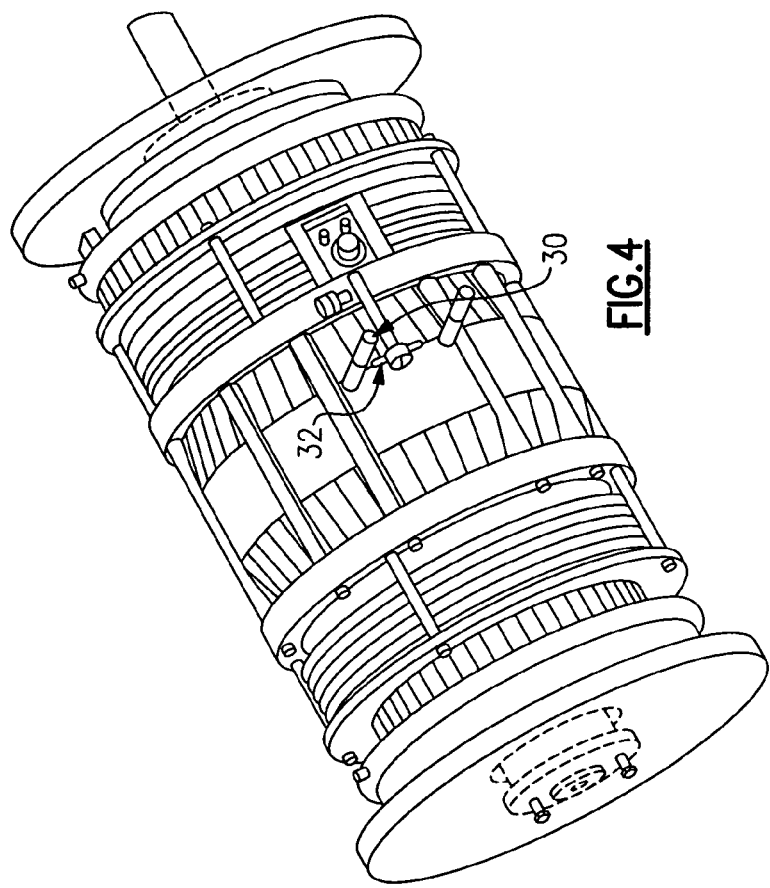
FIG. 4 is a pictorial view illustrating HTS field coil and cryostat/EM shield cooling lines for the HTS homopolar inductor alternator depicted in FIG. 2, according to one embodiment of the invention.

FIG. 4 is a pictorial view illustrating HTS field coil cooling lines 30 and cryostat/EM shield cooling lines 32 for the HTS homopolar inductor alternator 10 depicted in FIGS. 1 and 2, according to one embodiment of the invention. The compact water cooling jacket thermally integrated with the cryostat/EM shield 28 described below cools the cryostat bore and side plate to effectively dissipate induced eddy current heating without taking any significant additional space.

Figure 5:
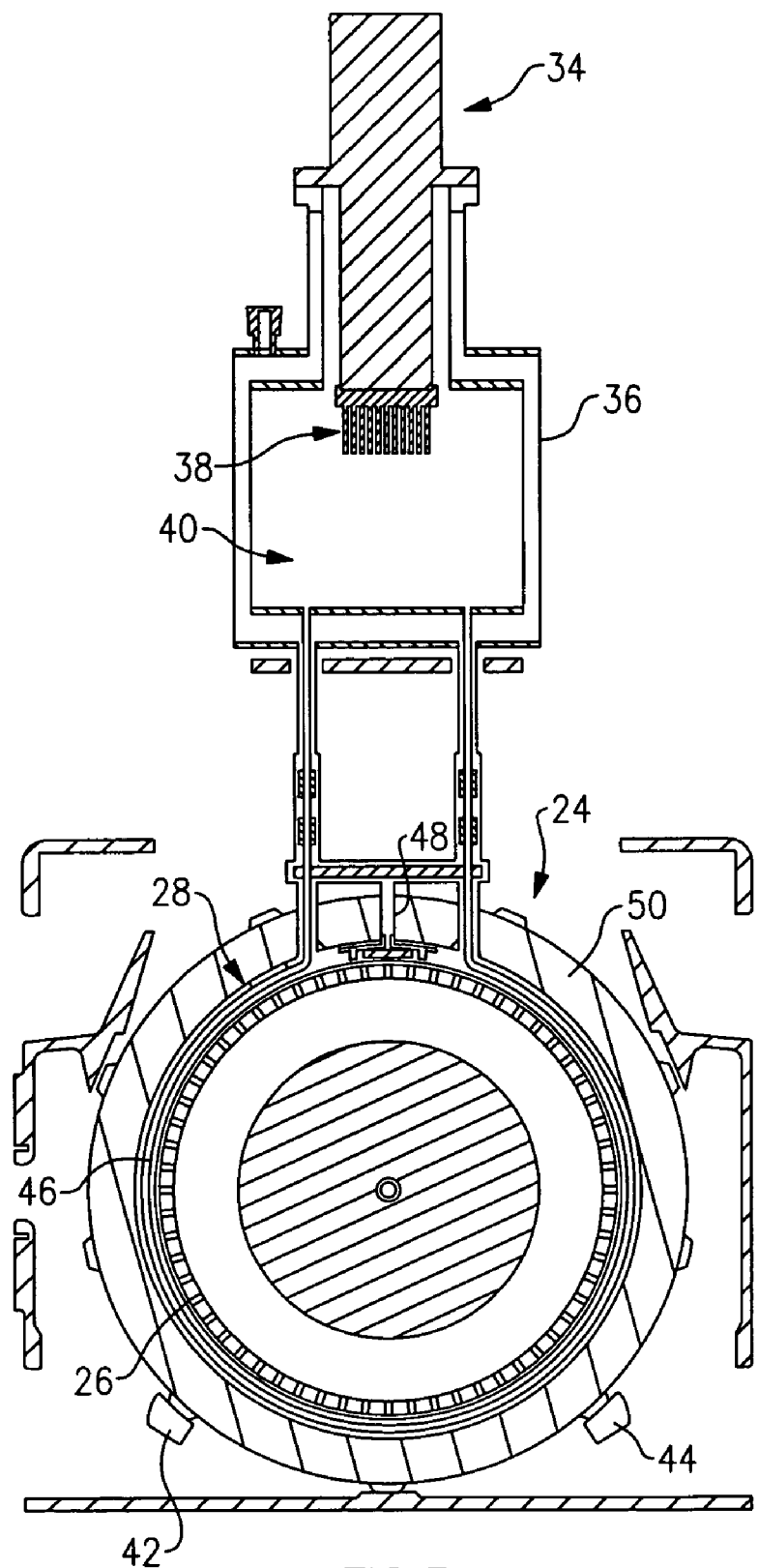
FIG. 5 is a cross sectional view through the HTS field coil and cryostat of the homopolar inductor alternator depicted in FIG. 4, illustrating additional details of the HTS field coil and cryostat.

FIG. 5 is a cross sectional view through the HTS field coil/cryostat/EM shield assembly 24 of the homopolar inductor alternator 10 depicted in FIG. 4, illustrating the HTS field coil 26 and cryostat/EM shield 28 in further detail. The HTS field coil/cryostat/EM shield assembly 24 is depicted in its normal operating position with a single-stage cryocooler 34 at the top of the assembly 24. The cryocooler 34 is attached to a liquid cryogen dewar 36 at its lower end. The cryocooler 34 includes a cryogen recondenser 38 at its lower portion that is disposed internal to the cryogen dewar 36. A supply inventory of liquid cryogen 40 is contained within the liquid cryogen dewar 36, below the cryogen recondenser 38. Cryogen supply and return cooling tubes 42, 44 forming the end portions of a cryogen cooling coil 46 that forms a gravity driven thermosiphon cooling system of liquid cryogen 40, are bonded to the cryogen dewar 36, and deliver the liquid cryogen 40 to the cooling coil 46 such that the HTS field coil 26 is conduction cooled indirectly by nucleate boiling of the liquid cryogen 40. The HTS field coil 26 is thermally insulated and mechanically suspended inside the cryostat/EM shield 28 by a thin cantilever fiber reinforced composite shell 48, attached to the cryostat/EM shield 28 at one end and to the HTS field coil 26 at the other end.

A compact water cooling jacket 50 is thermally integrated with the cryostat/EM shield 28 and cools the cryostat bore and side plate to effectively dissipate induced eddy current heating without taking any significant additional space. An inlet port 52 is coupled to a cooling jacket inlet cooling line for entry of coolant to the jacket 50, while an outlet port 54 is coupled to a cooling jacket return cooling line to provide an exit for the coolant.

Figure 6:
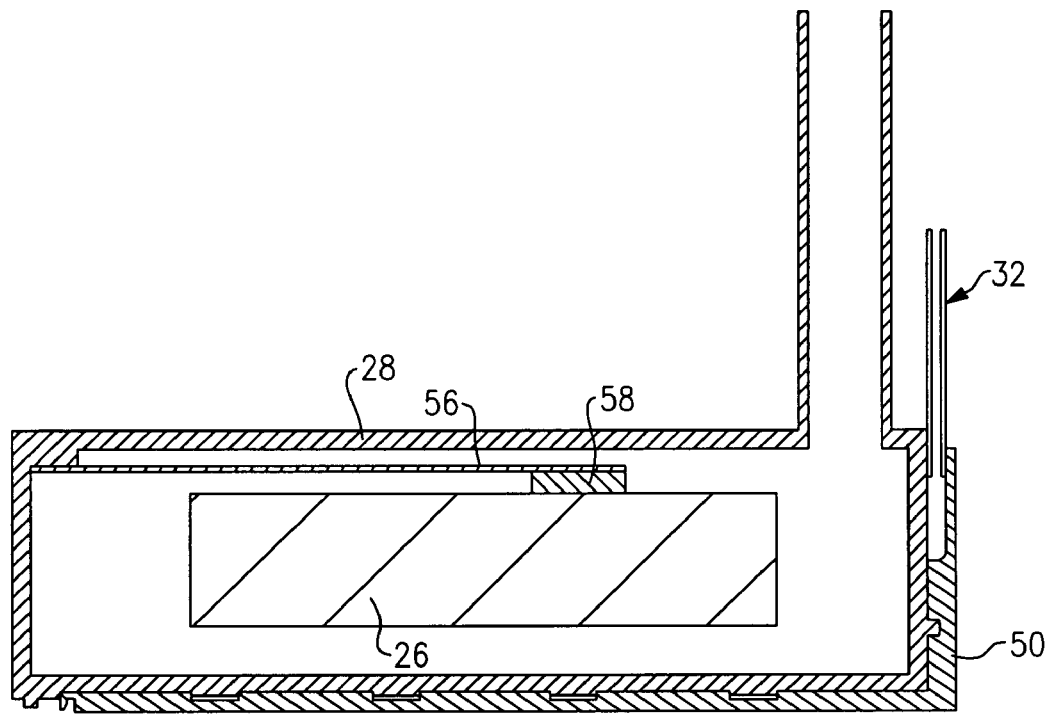
FIG. 6 illustrates in more detail, the inlet/outlet cooling tubes and cryostat/EM shield cooling jacket for the HTS field coil and cryostat/EM shield depicted in FIGS. 3-5, according to one embodiment of the invention.

FIG. 6 illustrates in more detail, the inlet/outlet cooling tubes 32 and cryostat/EM shield cooling jacket 50 for the HTS field coil 26 and cryostat/EM shield 28 depicted in FIGS. 3-5, according to one embodiment of the invention. The HTS field coil 26 is thermally insulated and mechanically suspended inside the vacuum insulated coil cryostat/EM shield 28 by a composite thermal support 56 that is attached to the cryostat/EM shield 28 at one end and to a HTS field coil over-wrap heat exchanger 58 at its other end. A cryogen cooling tube in contact with the heat exchanger 58 operates to provide indirect thermal conduction cooling of the HTS field coil 26 via a boiling liquid cryogen such as Neon contained within the cryogen cooling tube. The evaporated cryogen (e.g. Neon) is re-condensed remotely outside the coil cryostat/EM shield 28 by a cryocooler coldhead discussed above with reference to FIG. 5.

Figure 7:
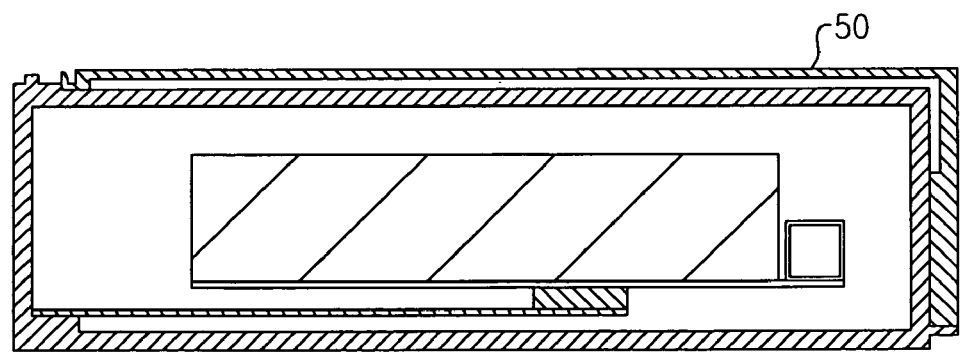
FIG. 7 illustrates in more detail, the cryostat/EM shield cooling jacket for the HTS field coil and cryostat/EM shield depicted in FIGS. 3-6, according to one embodiment of the invention.

FIG. 7 shows another view of the cryostat/EM shield cooling jacket 50 for the HTS field coil 26 and cryostat/EM shield 28 shown in FIG. 6.

Figure 8:
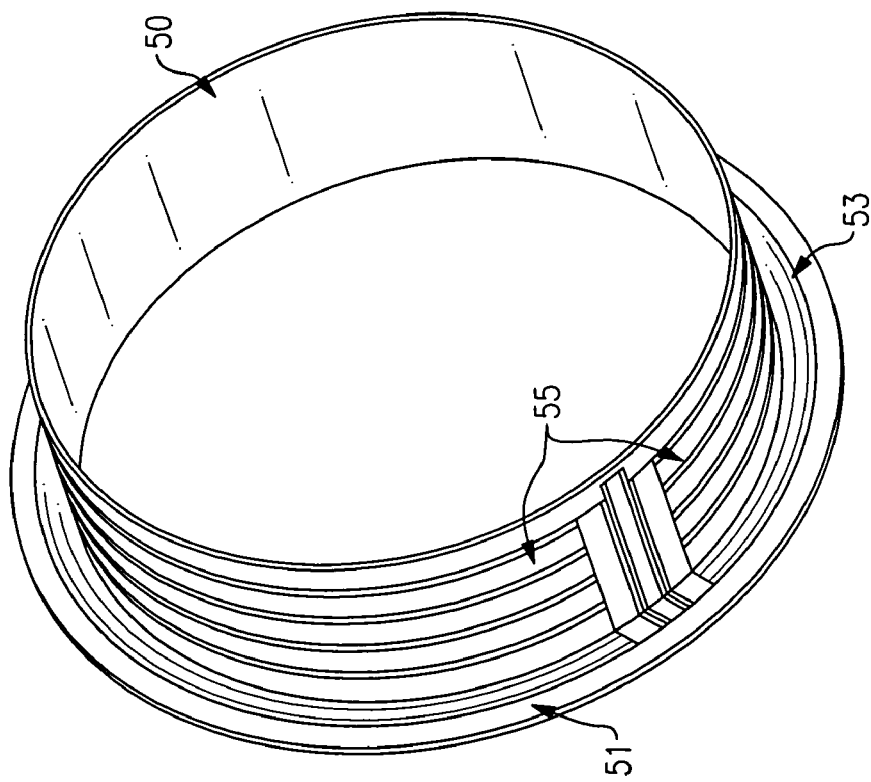
FIG. 8 illustrates in more detail, the cooling lines associated with the cryostat/EM shield cooling jacket depicted in FIGS. 3-6, according to one embodiment of the invention.

FIG. 8 illustrates in more detail, the cooling lines 32 associated with the cryostat/EM shield cooling jacket 50 depicted in FIGS. 3-7, according to one embodiment of the invention. The cryostat/EM shield cooling jacket 50 can be seen to include an inlet cooling line 51 and a return cooling line 53. The arrows 55 in the figure represent the direction of water flowing through the cooling lines 51, 53. The cryostat/EM shield cooling jacket 50 provides a compact water cooling structure that is thermally integrated with the high conductivity cryostat/EM shield to remove eddy current heating produced in the cryostat vacuum envelope without taking any significant additional space within the homopolar inductor alternator 10. The features of the cryostat/EM shield cooling jacket 50 therefore provide for efficient use of a superconducting field winding with an alternating magnet field environment to facilitate significantly high machine power density, efficiency and reduced cost.

Figure 9:
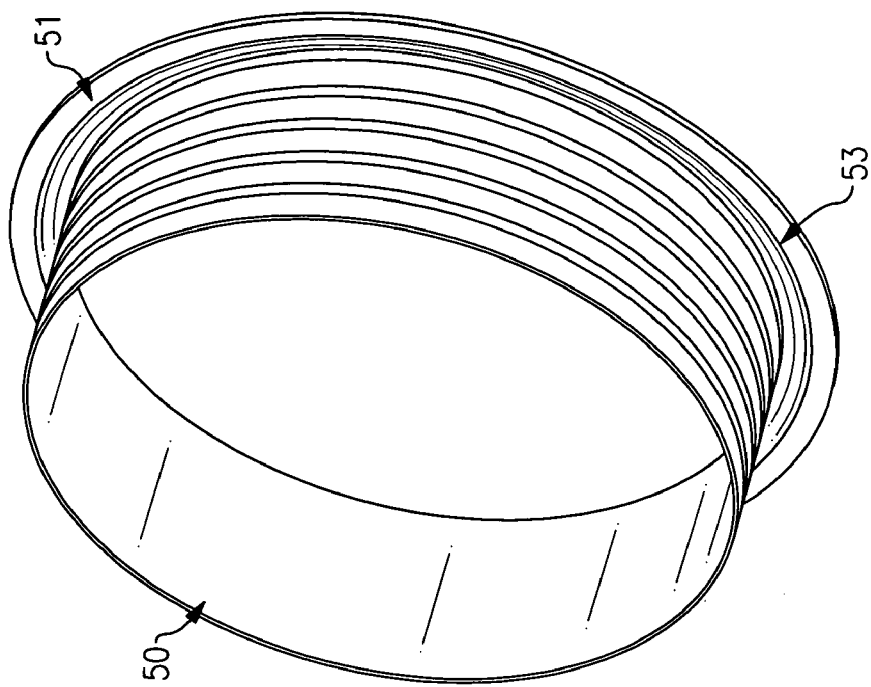
FIG. 9 illustrates another view of the cooling lines shown in FIG. 8.

FIG. 9 illustrates another view of the cooling lines 32 shown in FIG. 8.

In summary explanation, a superconducting homopolar inductor alternator 10 has been described that includes a vacuum insulated superconducting field coil cryostat 28 constructed of high electrical and thermal conductivity materials to provide an effective EM shield that attenuates the alternating magnetic fields reaching the superconducting coil 26 by orders of magnitude. The eddy current heating produced in the cryostat vacuum envelope is removed by a compact water cooling jacket 50 thermally integrated with the vacuum envelope.

The HTS field coil 26 and surrounding cryostat/EM shield 28 advantageously provides for a very lightweight compact superconducting magnet structure that is capable of withstanding high shock and vibration loads. The HTS field coil 26 and surrounding cryostat/EM shield 28 further enable efficient use of a superconducting field winding within an alternating magnetic field environment to yield significantly higher machine power density and efficiency at a reduced cost.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A superconducting field coil assembly comprising:
   a superconducting field coil mechanically suspended via a cantilevered support within a vacuum insulated electromagnetic (EM) shielded cryostat; and
   a cooling jacket thermally integrated with the outer surface of the cryostat.

2. The superconducting field coil assembly according to claim 1, wherein the field coil assembly is a homopolar inductor alternator field coil assembly.

3. The superconducting field coil assembly according to claim 1, wherein the vacuum insulated EM shielded cryostat comprises a high electrical and thermal conductivity EM shield enveloping the superconducting field coil.

4. The superconducting field coil assembly according to claim 3, wherein the high conductivity EM shield comprises at least one of copper and aluminum.

5. The superconducting field coil assembly according to claim 3, wherein the high conductivity EM shield has a skin thickness sufficient to attenuate alternating magnetic fields reaching the superconducting field coil.

6. The superconducting field coil assembly according to claim 1, wherein the cooling jacket is a water cooling jacket.

7. The superconducting field coil assembly according to claim 1, wherein the cooling jacket is configured to cool the cryostat by dissipating induced eddy current heating.

8. The superconducting field coil assembly according to claim 1, wherein the cooling jacket is configured to envelope the cryostat.

9. The superconducting field coil assembly according to claim 1, wherein the superconducting field coil is disposed between the rotor and the stator portions of a superconducting homopolar inductor alternator.

10. A superconducting homopolar inductor alternator comprising:
a superconducting field coil assembly disposed between rotor and the stator portions of the superconducting homopolar inductor alternator, the superconducting field coil assembly comprising a superconducting field coil mechanically suspended via a cantilevered support within an electro-magnetic (EM) shielded cryostat; and
a cooling jacket thermally integrated with the outer surface of the EM shielded cryostat.

11. The superconducting homopolar inductor alternator according to claim 10, wherein the EM shielded cryostat comprises a high electrical and thermal conductivity EM shield enveloping the superconducting field coil.

12. The superconducting homopolar inductor alternator according to claim 10, wherein the high conductivity EM shield comprises at least one of copper and aluminum.

13. The superconducting homopolar inductor alternator according to claim 10, wherein the high conductivity EM shield has a skin thickness sufficient to attenuate alternating magnetic fields reaching the superconducting field coil.

14. The superconducting homopolar inductor alternator according to claim 10, wherein the cooling jacket is a water cooling jacket.

15. The superconducting homopolar inductor alternator according to claim 10, wherein the cooling jacket is configured to cool the cryostat by dissipating induced eddy current heating within the cryostat.

16. The superconducting homopolar inductor alternator according to claim 10, wherein the cooling jacket is configured to envelope the EM shielded cryostat.

* * * * *